United States Patent
Buis et al.

(10) Patent No.: US 7,733,509 B2
(45) Date of Patent: Jun. 8, 2010

(54) METHOD AND APPARATUS FOR PRINTING XML DIRECTLY USING A FORMATTING TEMPLATE

(75) Inventors: Roger Lee Buis, Fort Lupton, CO (US); Steven Mark Gebert, Boulder, CO (US); Reinhard Heinrich Hohensee, Boulder, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 1487 days.

(21) Appl. No.: 09/963,807

(22) Filed: Sep. 26, 2001

(65) Prior Publication Data

US 2003/0058469 A1 Mar. 27, 2003

(51) Int. Cl.
*G06F 3/12* (2006.01)
*G06K 15/00* (2006.01)

(52) U.S. Cl. .............. 358/1.15; 358/1.13; 358/1.18

(58) Field of Classification Search ............... 358/1.15, 358/1.2, 1.11, 1.13, 1.18, 1.1, 1.9, 1.6, 407, 358/468; 715/234, 237, 239, 713, 760; 707/3, 707/6, 104.1
See application file for complete search history.

(56) References Cited

U.S. PATENT DOCUMENTS

| 6,012,098 | A | 1/2000 | Bayeh et al. | |
|---|---|---|---|---|
| 6,154,738 | A | 11/2000 | Call | |
| 6,487,566 | B1 * | 11/2002 | Sundaresan | 715/513 |
| 6,507,410 | B1 * | 1/2003 | Robertson et al. | 358/1.18 |
| 6,631,375 | B2 * | 10/2003 | Jecha et al. | 707/9 |
| 6,763,343 | B1 * | 7/2004 | Brooke et al. | 707/1 |
| 6,832,351 | B1 * | 12/2004 | Batres | 715/505 |
| 6,918,084 | B1 * | 7/2005 | Slaughter et al. | 715/513 |

FOREIGN PATENT DOCUMENTS

| EP | 0806721 | 10/1997 |
|---|---|---|
| EP | 1006431 | 6/2000 |
| WO | WO 0070837 | 11/2000 |

OTHER PUBLICATIONS

XSL Example (http://www.comptechdoc.org/independent/web/xml/guide/xslexample.html).*
"Employees" (http://www.topxml.com/xsItStylesheets/xsIt_data_formatting.asp). Accessed Mar. 11, 2007.*
Feb. 6, 2003, Notification of Transmittal of the International Search Report or the Declaration, PCT/GB 02/04294, Filed Sep. 19, 2002.
"XFA Technology," JetForm XML Forms Architecture XFA.Org, http://www.xfa.com/technology.html, 12 pp.
Usdina et al., "XML: Not a Silver Bullet, But a Great Pipe Wrench," StandardView, vol. 6, No. 3, Sep. 1998, pp. 125-132.

\* cited by examiner

*Primary Examiner*—Dov Popovici
(74) *Attorney, Agent, or Firm*—Merchant & Gould (57) ABSTRACT

A printing system and method for printing XML files directly using a formatting template is disclosed. The formatting template includes an XML Descriptor (XMD) associated with each XML data element in a tree structure of the XML document. XML Descriptors (XMDs) are identified by an associated qualified tag. The qualified tag includes a concatenation of a plurality of XML start tags representing start tags hierarchically traversed in the tree structure of the XML document to reach the XML data element associated therewith. The XMDs provide formatting to content associated with the XML data element. A printer prints the rendered XML document according to the template using the XMDs.

11 Claims, 5 Drawing Sheets

METHOD AND APPARATUS FOR PRINTING XML DIRECTLY USING A FORMATTING TEMPLATE

BACKGROUND OF THE INVENTION

1. Field of the Invention

This invention relates in general to printing systems, and more particularly to a method and apparatus for printing XML directly using a formatting template.

2. Description of Related Art

Extensible Markup Language (XML) is a text-based markup language that is designed to make information self-describing. XML is designed to improve the functionality of the Web by providing more flexible and adaptable information identification. It is called extensible because it is not a fixed format like HTML (a single, predefined markup language). Instead, XML is actually a "metalanguage", i.e., a language for describing other languages, which lets you design your own customized markup languages for limitless different types of documents. XML can do this because it's written in Standard Generalized Markup Language (SGML), the international standard metalanguage for text markup systems (ISO 8879).

XML is fast becoming the standard for data interchange on the Web. Indeed, since XML was completed in early 1998 by the World Wide Web Consortium (W3C), the standard has spread like wildfire through science and into industries. XML is intended to make it easy and straightforward to use SGML on the Web, e.g., easy to define document types, easy to author and manage SGML-defined documents, and easy to transmit and share them across the Web. XML defines an extremely simple dialect of SGML which is completely described in the XML Specification. The goal is to enable XML to be processed in the way that is now possible with HTML. For this reason, XML has been designed for ease of implementation.

As with HTML, you identify data using tags (identifiers enclosed in angle brackets, e.g., <...>). Collectively, the tags are known as "markup". But unlike HTML, XML tags tell you what the data means, rather than how to display it. Where an HTML tag says something like "display this data in bold font" (<b>...</b>), an XML tag acts like a field name in your program. It puts a label on a piece of data that identifies it (for example: <message>...</message>).

In the same way field names for a data structure are defined, programmers are free to use any XML tags that make sense for a given application. Naturally, though, for multiple applications to use the same XML data, the tag names intended to be used have to be agreed upon.

A structured document formed of predetermined elements, such as a document described by XML is structured only by content and structure. The definition information regarding a style for the document, such as format and attribute information required for display or printed, is defined and administered independently of the document content information.

To display such a structured document on a displaying apparatus, or to print the document on a printing apparatus, information about the structure of the document ("structure information") is first analyzed and separately defined information about style definition ("style definition information") is obtained. The style definition information depends on the analyzed structure and, once obtained, is set as display or print attribute information.

The result of such a structure analysis may be represented in a tree structure. The independently defined style definition information is often defined in relation to a set of identifiers (hereinafter referred to as "tags") that indicate the elements of the document structure in terms of the various units of the document.

Authors and providers can design their own document types using XML, instead of only using HTML. Document types can be explicitly tailored to an audience, so the cumbersome fudging that has to take place with HTML can become a thing of the past. Thus, authors and designers are free to invent their own markup elements. Moreover, information content can be richer and easier to use because the descriptive and hypertext linking abilities of XML are much greater than those of HTML. XML can provide more and better facilities for presentation using stylesheets such as CSS and XSL.

In HTML, default styling is built into browsers because the tagset of HTML is predefined and hardwired into browsers. In XML, where you can define your own tagset, browsers cannot know what names are going to be used and what they will mean, so a stylesheet is needed if the formatted text is to be displayed. For example, browsers which read XML will accept and use a CSS stylesheet at a minimum, but you can also use the more powerful XSLT stylesheet language to transform your XML into HTML.

The Cascading Stylesheet Specification (CSS) provides a simple syntax for assigning styles to elements, and has been implemented in most browsers. The Extensible Stylesheet Language (XSL) has been created for use specifically with XML. XSL uses XML syntax (an XSL stylesheet is an XML file) and has widespread support from several major vendors, although current browser support is limited. XSL comes in two flavors. XSL is a pure formatting language and needs a text formatter like Formatting Objects Processor (FOP) or PassiveTeX to create printable output (both can produce PDF). XSLT (T for Transformation), is a language to specify transformations of XML into HTML either inside the browser or at the server before transmission. It can also specify transformations from one vocabulary of XML to another, and from XML to plaintext.

Style sheets originated in publishing and document management applications. However XML applications go behind traditional document management and are useful for these applications as well. The SGML approach was to separate the document from its presentation. A document can be published in different forms on any media. For example, there's the hardcover edition, the pocket edition and the CD-ROM edition. In fact, with SGML, documents are "retargetable": For example, the same document can be published automatically on different media including paper and electronic media. The operative word is automatically. To achieve this goal, SGML (and XML) encode high-level semantic information. For example, XML markup would identify the title, the paragraphs and the keywords in a document. The markup is specifically not concerned with whether the title is in Garamond or AvantGarde font. The font, the size and the color are properties of a published document on a given medium. More importantly, these properties can be automatically deduced from the high-level, semantic markup. Therefore software can automatically prepare documents for publishing. When printing, the title may be typeset in AvantGarde and the paragraphs in Garamond. Keywords require no special formatting but are compiled in an index. When publishing on the web, the title may be a graphic in its own frame and the list of keywords may be an index with hyperlinks.

Specific instructions on how to prepare the document for certain media are collected in stylesheets. Different stylesheets for print and for the web are used. Different stylesheets may even be used for the hardcover and the pocket editions.

An XSL stylesheet is a set of rules where each rule specifies how to format certain elements in the document. The stylesheets have rules for title, paragraphs and keywords. With XSL, these rules are powerful enough not only to format the document but also to reorganize it, e.g. by moving the title to the front page or extracting the list of keywords. This can lead to exciting applications of XSL outside the realm of traditional publishing. For example, XSL can be used to convert documents between the company-specific markup and a standard one.

Style sheets are, as discussed above, separated from documents. Therefore one document can have more than one stylesheet and, conversely, one stylesheet can be shared amongst several documents. The ability to associate several stylesheets to a single document means that the same document can be rendered differently depending on the media. The ability to share a stylesheet between several documents necessitates enforcing a corporate style.

As the Web became more commercial, publishers wanted the same control over quality of output that they had with the printed medium. This gradually led to an increasing use of concrete presentation controls such as explicit fonts and absolute positioning of material on the page. The unfortunate but entirely predictable side effect was that it became increasingly difficult to deliver the same content to alternative devices such as digital TV sets and Wireless Application Protocol (WAP) phones. Until now, in order to control printing, content providers used stylesheets, as described above, to control the rendering, e.g. fonts, colors, leading, margins, typefaces, and other aspects of style, of a Web document without compromising its structure. To print XML data is to apply a stylesheet, such as XSL, to the data using an XSLT processor. This processor outputs formatted objects, which are then input to a composer that generates final-form pages. These pages are then converted into a page description language (PDL) such as PostScript, Portable Document Format (PDF), or Advanced Function Presentation (AFP). Nevertheless, stylesheets are cumbersome and do not allow a user to print XML data efficiently and quickly. In a production system, for example, print speeds exceed 1000 pages/minute. Transforming XML data with an XSL stylesheet is processing-intensive and does not support such print speeds.

It can be seen then that there is a need for a method and apparatus for printing XML directly using a formatting template.

SUMMARY OF THE INVENTION

To overcome the limitations in the prior art described above, and to overcome other limitations that will become apparent upon reading and understanding the present specification, the present invention discloses a method and apparatus for printing XML directly using a formatting template.

The present invention solves the above-described problems by using a formatting template, such as a Page Definition, to format each XML element. The formatting template contains descriptors that specify presentation parameters such as position, rotation, font, color, etc. The descriptors are indexed using a concatenation of the XML tags that must be traversed to get to a particular XML element.

A XML formatting template in accordance with the principles of the present invention includes a data map format containing XML descriptors defining the formatting for elemental content of the XML file.

Other embodiments of a XML formatting template system in accordance with the principles of the invention may include alternative or optional additional aspects. One such aspect of the present invention is that the XML descriptors are identified by a qualified tag.

Another aspect of the present invention is that the qualified tag comprises a concatenation of XML element start tags that must be traversed in the XML file to get to a particular element.

Another aspect of the present invention is that the qualified tag identifies a description that is used to format the content for the element.

Another aspect of the present invention is that the qualified tag identifies a description that is generated or modified whenever a start tag is encountered.

Another aspect of the present invention is that the XML file to be printed is parsed into element contents that can be broken into fields and processed using a chain of field XMDS.

Another aspect of the present invention is that the element contents are broken into fields either with byte counts or with delimiters.

Another aspect of the present invention is that a chain of attribute XMDS are used for formatting attributes, wherein the attributes are broken into fields, the fields being formatted with a chain of field XMDS.

In another embodiment of the present invention, a printing system is provided. The printing system includes a spooler for receiving printable information from the print channel, a print services facility for parsing an XML file, formatting the XML file according to a formatting template, the print services facility organizing a data stream representing the formatted XML file and generating a print steam having been formatted using the formatting template and a printer for printing the print steam according to the formatting defined by the formatting template, wherein the formatting template defines a data map format containing XML descriptors defining the formatting for an element of the XML file.

Another aspect of the printing system of the present invention is that the XML descriptors are identified by a qualified tag.

Another aspect of the printing system of the present invention is that the qualified tag comprises a concatenation of XML element start tags that must be traversed in the XML file to get to a particular element.

Another aspect of the printing system of the present invention is that the qualified tag identifies a description that is used to format the content for the element.

Another aspect of the printing system of the present invention is that the qualified tag is generated whenever a start tag is encountered.

Another aspect of the printing system of the present invention is that the XML file to be printed is parsed into element contents that can be broken into fields and processed using a chain of field XMDS.

Another aspect of the printing system of the present invention is that the element contents are broken into fields either with byte counts or with delimiters.

Another aspect of the printing system of the present invention is that a chain of attribute XMDS are used for formatting attributes, wherein the attributes are broken into fields, the fields being formatted with a chain of field XMDS.

In another embodiment of the present invention, a method for printing XML files directly using a formatting template is provided. The method includes placing an XML file to be printed on a server spool, providing a formatting template to a print services facility, wherein the formatting template defines a data map format containing XML descriptors defining the formatting for an element of the XML file and pulling the XML file from the spooler for generating a formatted print stream using the formatting template.

Another aspect of the method of the present invention is that the method further includes parsing the XML file to be printed into elemental content, searching the formatting template for formatting instructions for a parsed element content, determining whether the search was successful, formatting the element content using formatting instructions obtained by the search and determining whether the end of the document has been reached.

Another aspect of the method of the present invention is that the method further includes continuing to process parsed element content.

Another aspect of the method of the present invention is that the method further includes sending the formatted data stream to a printer.

Another aspect of the method of the present invention is that the formatting template comprises a chain of attribute XMDS for formatting attributes, wherein the attributes are broken into fields, the fields being formatted with a chain of field XMDS.

In another embodiment of the present invention, an article of manufacture comprising a program storage medium readable by a computer is provided. The medium tangibly embodies one or more programs of instructions executable by the computer to perform a method for printing XML files directly using a formatting template, wherein the method includes placing an XML file to be printed on a server spool, providing a formatting template to a print services facility, wherein the formatting template defines a data map format containing XML descriptors defining the formatting for an element of the XML file and pulling the XML file from the spooler for generating a formatted print stream using the formatting template.

Another aspect of the article of manufacture of the present invention is that the method further includes parsing the XML file to be printed into elemental content, searching the formatting template for formatting instructions for a parsed element content, determining whether the search was successful, formatting the element content using formatting instructions obtained by the search and determining whether the end of the document has been reached.

Another aspect of the article of manufacture of the present invention is that the method further includes continuing to process parsed element content when the end of the document is not reached.

Another aspect of the article of manufacture of the present invention is that the method further includes sending the formatted data stream to a printer.

Another aspect of the article of manufacture of the present invention is that the formatting template comprises a chain of attribute XMDS for formatting attributes, wherein the attributes are broken into fields, the fields being formatted with a chain of field XMDS.

In another embodiment of the present invention, another embodiment of a printing system is provided. The printing system includes spooler means for receiving printable information from the print channel, print driver means for parsing an XML file, formatting the XML file according to a formatting means, the print services facility organizing a data stream representing the formatted XML file and generating a print steam having been formatted using the formatting template and printing means for printing the print steam according to the formatting defined by the formatting template, wherein the formatting means defines a data map format containing XML descriptors defining the formatting for an element of the XML file.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for printing XML directly using a formatting template. A formatting template, such as a Page Definition, is used to format each XML element. The formatting template contains descriptors that specify presentation parameters such as position, rotation, font, color, etc. The descriptors are indexed using a concatenation of the XML tags that must be traversed to get to a particular XML element.

Figure 1:
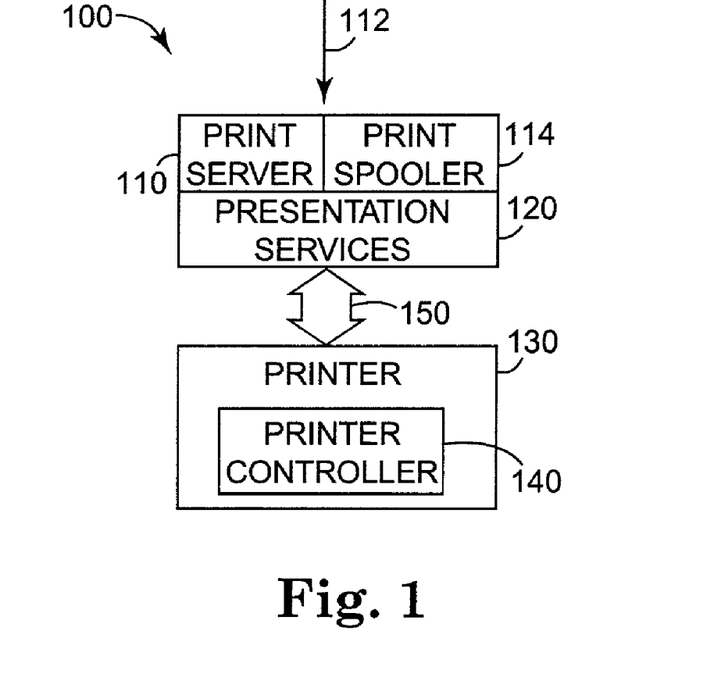
FIG. 1 illustrates a block diagram of one embodiment of a printer system according to the present invention.

FIG. 1 illustrates a block diagram of one embodiment of a printer system 100 according to the present invention. In FIG. 1, the printer system 100 includes a print server 110 for receiving the input print data stream 112, a print spooler 114 for controlling the spooling of data files, and presentation services 120 for generating appropriate commands to drive an attached printer 130 using a bi-directional print data stream 150. The spooler 114 receives printable information from the print channel. The print server 110 may also include other components that are not shown for performing basic tasks, such as monitoring and configuring attached printers, and providing print job management. The printer server 110 converts the input print data steam 112 to a data steam supported by the printer 130.

Figure 2:
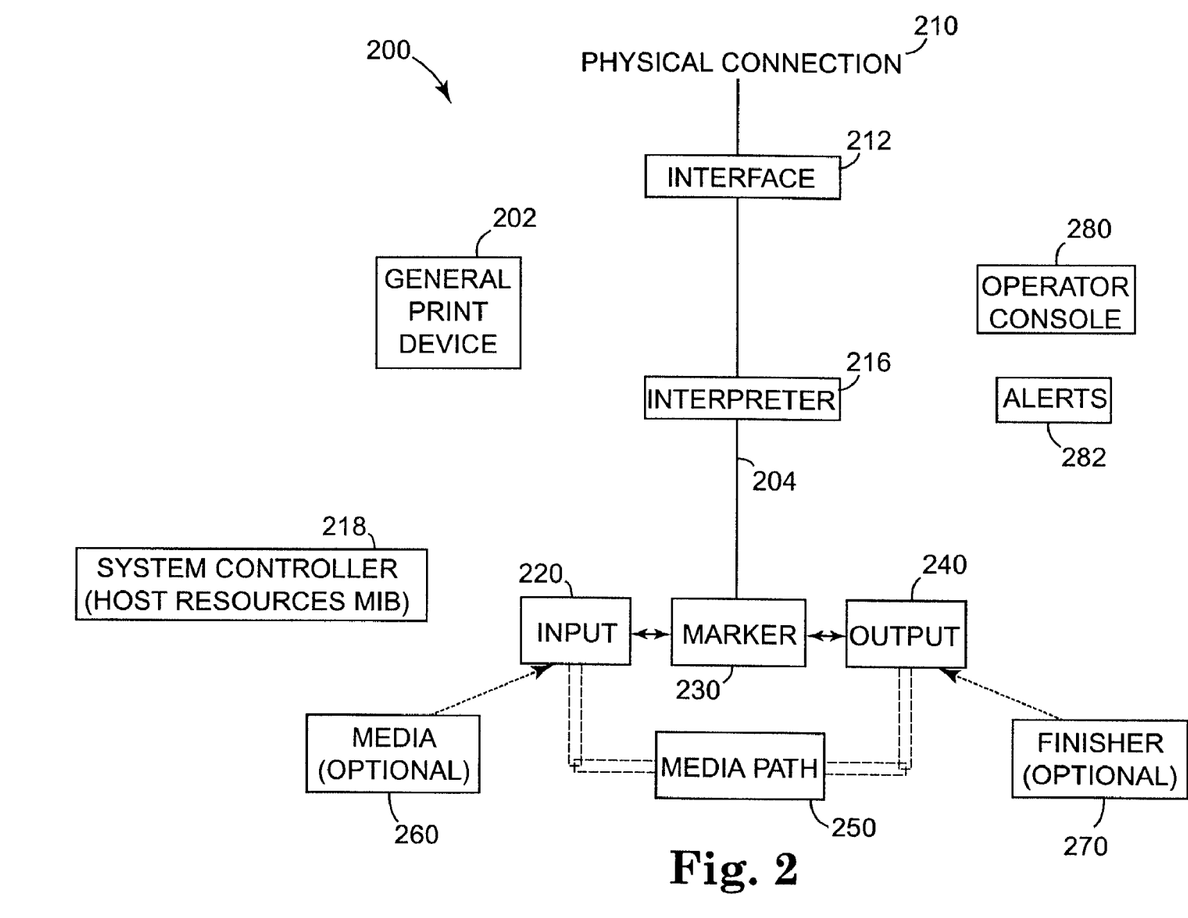
FIG. 2 illustrates a more detailed block diagram of a print device, such as printers and digital copiers, according to the present invention.

FIG. 2 illustrates a more detailed block diagram of a print device 200, such as printers and digital copiers, according to the present invention. Those skilled in the art will recognize that the sub-units of the print device illustrated in FIG. 2 may not necessarily relate directly to any physically identifiable mechanism. Sub-units can also be a set of definable logical processes, such as interpreters for page description languages or command processors that set various operating modes of the print device.

FIG. 2 illustrates the three basic functions of the print device: (1) the flow of a print file into an interpreter and onto the marker, (2) the flow of media through the marker and (3) the auxiliary sub-units that control and facilitate the two flows. As shown in FIG. 2, the flow of the print data comes through a physical connection 210 on which some form of transport protocol stack is running to a print device interface 212. The data provided by the transport protocol (interface) is sent to the input of an interpreter 216. The interpreter 216 is responsible for the conversion of a description of intended print instances into images that are to be marked on the media. A print device may have one or more interpreters.

As shown in FIG. 2, the media 260 initially resides in Input sub-units 220 from which the media 260 is selected and then transported via a Media Path 250 first to a Marker 230 and then onto an Output 240 with (optionally) some finishing operations 270 being performed. The Input 220 is a mechanism that feeds media to be marked on into the print device. There may be as many Inputs 220 as there are distinctly selectable input "addresses". The Media 260 is an extension of the Input 220 which represents that media that is in an Input 220. The Output 240 is a mechanism that receives media that has been marked on. A print device may contain one or more Output mechanisms 240. There are as many Outputs 240 as there are distinctly selectable output "addresses". A finisher 270 is a unit that performs some operations on the media other than marking. Some examples of finishing processes are stapling, punching, binding, inserting, or folding. The optional finisher 270 can be used to apply highlight color, an image or MICR (magnetic ink character recognition) ink or toner to the media.

A Marker 230 is the mechanism that produces marks on the print media. A print device can contain one or more Markers 230. Some examples of multiple marker sub-units 230 are: a print device with separate markers for normal and magnetic ink or an image setter that can output to both a proofing device and final film. Each Marker 230 can have its own set of characteristics associated with it, such as marking technology and resolution. The media paths 250 encompass the mechanisms in the print device that move the media through the print device and connect all other media related units: Inputs 220, Outputs 240, Markers 230 and Finishers 270. A print device may contain one or more media paths 250. In general, the design of the media paths 250 determines the maximum speed of the print device as well as the maximum media size that the print device can handle. Media paths 250 are complex mechanisms and can contain many different identifiable sub-mechanisms such as media movement devices, media buffers, duplex units and interlocks. Not all of the various sub-mechanisms reside on every media path 250. For example, one media path may provide printing only on one surface of the media (a simplex path) and another media path may have a sub-mechanism that turns the media over and feeds it a second time through the marker sub-unit (a duplex path). The duplex path may even have a buffer sub-mechanism that allows multiple copies of the obverse side to be held before the reverse side of all the copies are marked.

The auxiliary sub-units, such as the General Print Device 202, Operator Console 280 and Alerts 282, facilitate control of the print device, inquiry/control of the operator panel, reporting of alerts, and the adaptation of the print device to various natural languages and characters sets. The General Print Device 202 is responsible for the overall control and status of the print device. The Operator Console 280 is used to display and modify the state of the print device. The console 280 can be as simple as a few indicators and switches or as complicated as full screen displays and keyboards. The Alert unit 282 is responsible for detecting reportable events, making an entry in the alert table and, if and only if, the event is a critical event, initiating a trap. For example, if the correct textured paper media is not loaded in the print device then this could be communicated back to the host through the bi-directional print data stream 150 as shown in FIG. 1. In addition to this, an alert via the Alert unit 282 can be used to notify the manager of the printer that the correct textured paper media is not loaded in the printing device, or that the textured paper media has changed.

All of the above described functions run on the System Controller 218 which represents the processor, memory and storage systems of the print device. The System Controller 218 implements the control functions for processing a print job. The System Controller 218 includes the Management Information Base (MIB), which provides access to data elements of the print device, such as the processor(s), memory, disk storage, file system and other underlying sub-mechanisms of the print device. The System Controller 218 can range from simple single processor systems to multiprocessor systems. In addition, controllers can have a full range of resources such as hard disks. Those skilled in the art will recognize that a print device may have more than one processor and multiple other resources associated with it.

Figure 3:
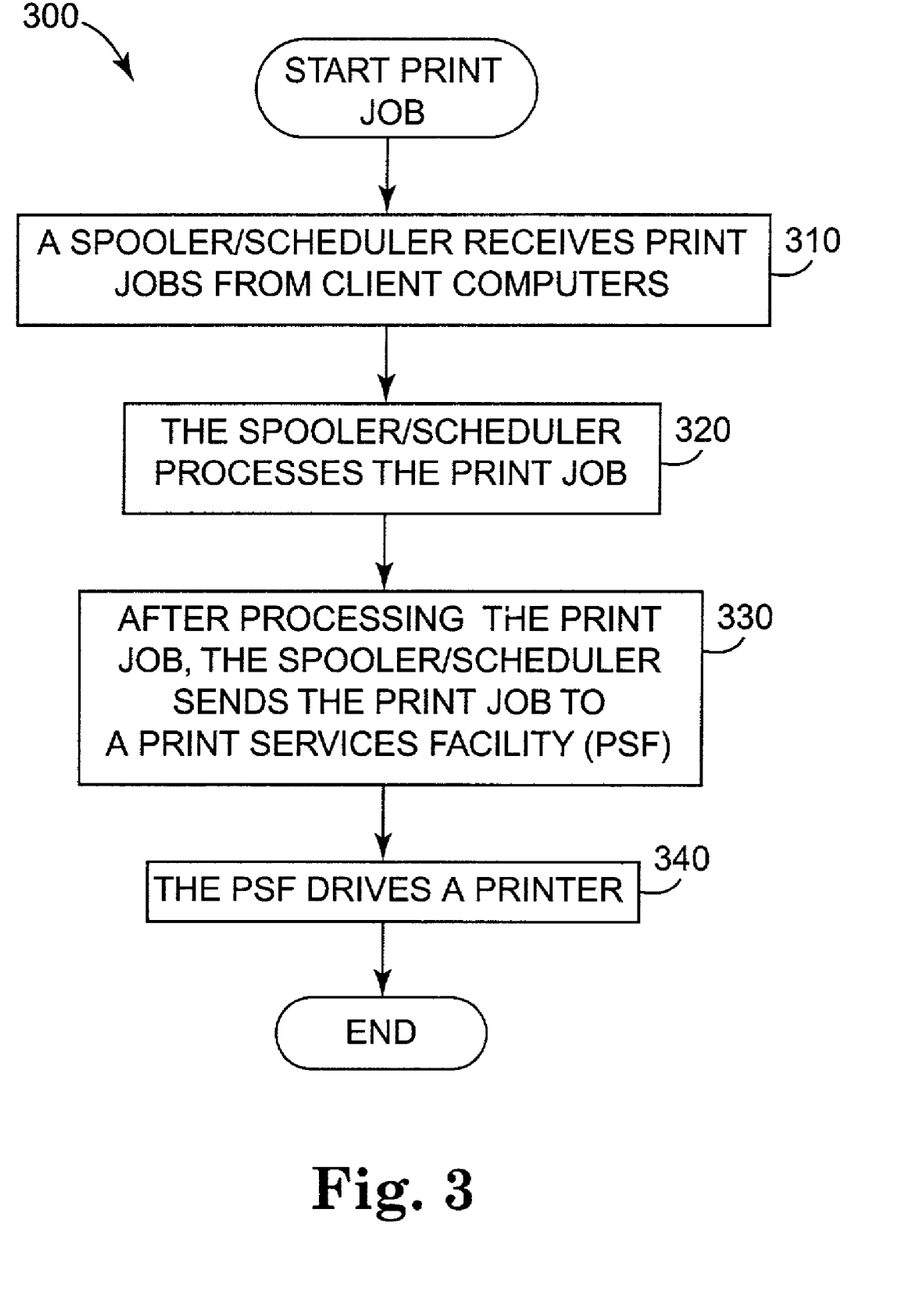
FIG. 3 illustrates the printing of a typical document.

FIG. 3 illustrates a flow chart of a method for printing of a typical document. A spooler/scheduler, comprised of the executable code and includes a suite of applications, receives print jobs from the client computers 310. The spooler/scheduler processes the print job 320. After processing the print job, the spooler/scheduler sends the print job to the Print Services Facility (PSF) 330. The PSF drives a printer 340. PSF is a presentation formatting and device management system which, in simple terms, can be thought of as a print driver. It controls the dialog with the printer and handles resource management to support the printer capabilities.

Figure 4:
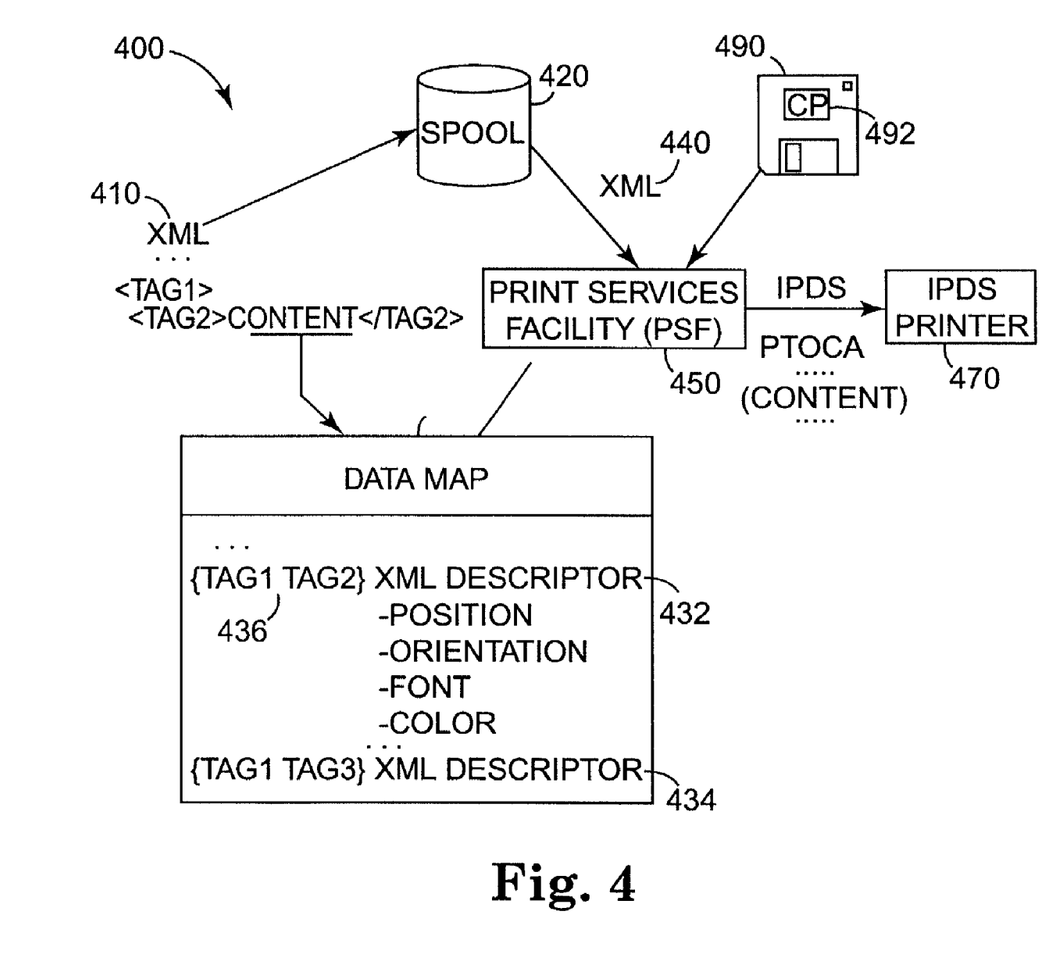
FIG. 4 illustrates XML printing using a formatting template according to the present invention.

FIG. 4 illustrates a process 400 for XML printing using a formatting template according to the present invention. In the example shown in FIG. 4, the formatting template provides a page definition represented by the Data Map format 430. In FIG. 4, the XML file 410 to be printed is placed directly on the server spool 420. The new Data Map format 430 contains XML Descriptors (XMDS) 432, 434 that are to XML data what Line Descriptors (LNDS) are to Line Data and what Record Descriptors (RCDS) are to record-format data. XMDs 432, 434 are identified by a "Qualified Tag" (QT) 436, similar to the way RCDs are identified by 10-byte record IDs. A QT 436 is a concatenation of the XML element start tags that must be traversed in the XML hierarchy to get to a particular element. For example, in the following XML hierarchy:

```
<person>
    <name>
        <first>John</first>
        <last>Doe</last>
    </name>
</person>
```

The QT for the XMD that is used to format the content for the element <first> is {person name first) (the space character is the delimiter between the start tag components that comprise the QT). The XML file to be printed 440 is pulled off the spool 420 by PSF 450 and is parsed. The PSF 450 organizes a data stream representing the formatted XML file which is passed to printer 470. Whenever a start tag is encountered, e.g. <last>, PSF 450 generates the QT (in this case it is {person name last}), and searches the current Data Map 430 for an XMD 432, 434 with matching QT. If a matching QT is found, the content of the element is formatted with an XMD 432, 434. If a matching QT is not found, processing resumes with the next start tag.

Note that as PSF 450 parses the XML file 440, the PSF 450 must buffer the XML start tags traversed in order to have a "current" QT. All of the formatting functions that were developed for record-formatting, e.g. page headers, page trailers, group headers, page numbering, text justification, graphics primitives, etc. are available for XML formatting with XMDS. An element content can be broken into fields, either with byte counts or with delimiters and processed using a chain of field XMDS.

An XML start tag may specify attributes for an element. For example:

<Person sex="male" height="72" weight="200">

Such attributes can be formatted with a chain of attribute XMDS. This is a separate chain from a field XMD chain. It selects an attribute by its name, e.g. "height" and then formats the attribute value. The attribute value may, in turn, be broken into fields and formatted using a chain of field XMDS. XML supports empty tags, i.e., structures which contain both the start tag and the end tag along with optional attributes inside a single pair of brackets, e.g. <person name="John Doe"/>. Empty tags are processed using their start component (which is person in this example), and their attributes can be formatted using attribute XMDS. The content of the start tags (including brackets) can be formatted with a field XMD that selects the start tag (via a flag-bit, for example) as the data field to be processed (similar to the way that a record ID can be formatted with an RCD).

Figure 5:
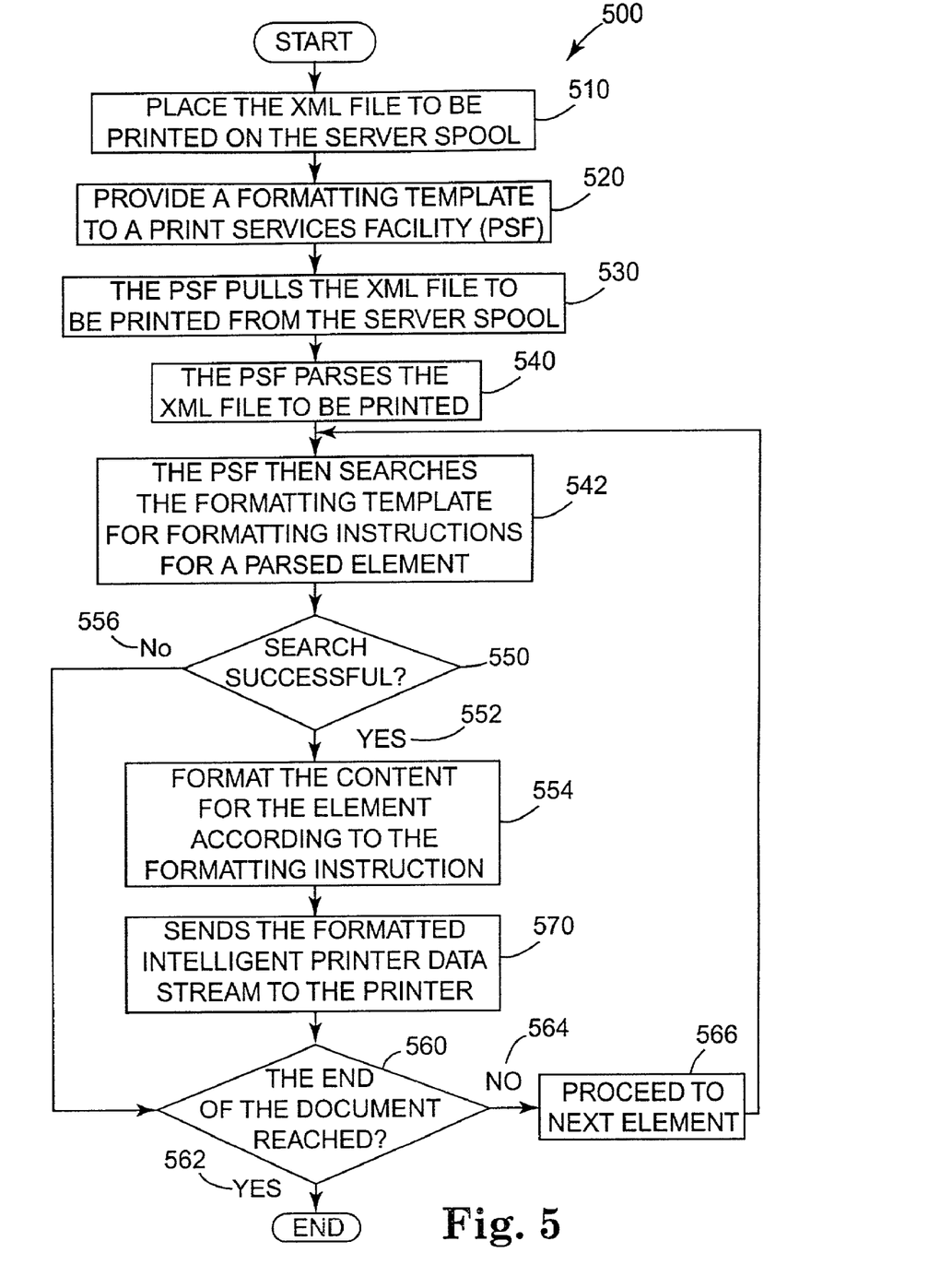
FIG. 5 illustrates a flow chart of the method for printing XML using a formatting template according to the present invention.

FIG. 5 illustrates a flow chart 500 of the method for printing XML using a formatting template according to the present invention. The XML file to be printed is placed on the server spool 510. A formatting template is provided to a Print Services Facility (PSF) 520. The formatting template defines a Data Map containing XMDs. The PSF pulls the XML file to be printed from the server spool 530. The PSF parses the XML file to be printed 540. The PSF then searches the formatting template for formatting instructions, i.e., an XMD identified by a QT, for a parsed element 542. A decision is made as to whether the search was successful 550. If yes 552, the content for the element is formatted according to the formatting instructions 554, then the PSF sends the formatted Intelligent Printer Data Stream (IPDS) to the printer 570. A decision is made as to whether the end of the document has been reached 560 if the search was not successful 556 or after the content for the element is formatted according to the formatting instructions. If not 564, the method proceeds to the next element 566 and the formatting template is searched for formatting instructions for the next parsed element. 542.

The present invention, while imposing some limitations on the XML, e.g. the XML must be text-based and cannot contain external resource references, promises a more direct and faster method to print XML.

A process for printing XML directly using a formatting template is performed by the Print Services Facility 450 as illustrated in FIG. 4 and described with reference to FIG. 5 above. The process described with reference to FIGS. 4-5, may be tangibly embodied in a computer-readable medium, e.g. one or more of the fixed and/or removable data storage devices 490, or other data storage or data communications devices. The computer program 492 of the storage device 490 may be loaded into PSF 450 to configure the PSF 450 for execution. The computer program 492 comprise instructions which, when read and executed by the PSF 450 causes the PSF 450 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A printer configured for rendering data in an XML document according to a formatting template, the formatting template comprising an XML Descriptor (XMD) associated with each XML data element in a tree structure of the XML document, wherein each of XML Descriptors (XMDs) are identified by an associated qualified tag, the qualified tag includes a concatenation of a plurality of XML start tags representing start tags hierarchically traversed in the tree structure of the XML document to reach the XML data element associated therewith, the XMDs providing formatting to content associated with the XML data element; the printer further configured for printing the rendered XML document according to the template using the XMDs.

2. The printer of claim 1, wherein the formatting template comprises a chain of XML descriptors for formatting attributes of XML data elements.

3. The printer of claim 1, wherein an XML data element that does not have a matching qualified tag is skipped and a next XML descriptor having a qualified tag is used in formatting an associated XML data element.

4. A printing system, comprising:
a spooler for receiving printable information from a print channel;
a print services facility for parsing an XML file; and
a printer for printing a print steam according to a formatting defined by a formatting template;
wherein the formatting template includes an XML Descriptor (XMD) associated with each XML data element in a tree structure of an XML document, wherein each of XML Descriptors (XMDs) are identified by an associated qualified tag, the qualified tag includes a concatenation of a plurality of XML start tags representing start tags hierarchically traversed in the tree structure of the XML document to reach the XML data element associated therewith, the XMDs providing formatting to content associated with the XML data element for printing by the printer using the XMDs.

5. The printing system of claim 4, wherein the formatting template comprises a chain of XML descriptors for formatting attributes of XML data elements.

6. The printing system of claim 4, wherein the print services facility skips an XML data element that does not have a matching qualified tag and uses a next XML descriptor having a qualified tag to format an associated XML data element.

7. The printing system of claim 4 further comprising a buffer for storing start tags in order as the XML file is parsed.

8. A method for printing XML documents directly using a formatting template, comprising:
placing an XML document to be printed on a server spool;

parsing the XML document to identify start tags hierarchically traversed in a tree structure of the XML document to reach an XML data element;

searching a formatting template comprising XML Descriptors (XMDs) identified by an associated qualified tag having a concatenation of a plurality of XML start tags hierarchically traversed in the tree structure of the XML document to reach the XML data element associated therewith until a qualified tag associated with an XML Descriptor (XMD) matches identified start tags hierarchically traversed in the tree structure of the XML document to reach the XML data element;

formatting the XML data element according to the XMD associated with the qualified tag having a concatenation of a plurality of XML start tags matching the identified start tags hierarchically traversed in the tree structure of the XML document to reach the XML data element;

merging the XML data element associated with the XMD associated with the qualified tag having a concatenation of a plurality of XML start tags matching the identified start tags hierarchically traversed in the tree structure of the XML document to reach the XML data element to produce a formatted print data stream; and printing the XML document using the produced print data stream formatted according to the XMDs associated with the XML data element in the tree structure of the XML document.

9. The method of claim 8 further comprising skipping an XML data element that does not have a matching qualified tag and using a next XML descriptor having a qualified tag to format an associated XML data element associated therewith.

10. An article of manufacture comprising a program storage medium readable by a computer, the medium tangibly embodying one or more programs of instructions executable by the computer to perform a method for printing XML files directly using a formatting template, the method comprising:

placing an XML document to be printed on a server spool;

parsing the XML document to identify start tags hierarchically traversed in a tree structure of the XML document to reach an XML data element;

searching a formatting template comprising XML Descriptors (XMDs) identified by an associated qualified tag having a concatenation of a plurality of XML start tags hierarchically traversed in the tree structure of the XML document to reach the XML data element associated therewith until a qualified tag associated with an XML Descriptor (XMD) matches the identified start tags hierarchically traversed in the tree structure of the XML document to reach the XML data element;

formatting the XML data element according to the XMD associated with the qualified tag having a concatenation of a plurality of XML start tags matching the identified start tags hierarchically traversed in the tree structure of the XML document to reach the XML data element;

merging the XML data element associated with the XMD associated with the qualified tag having a concatenation of a plurality of XML start tags matching the identified start tags hierarchically traversed in the tree structure of the XML document to reach the XML data element to produce a formatted print data stream; and printing the XML document using the produced print data stream formatted according to the XMDs associated with the XML data element in the tree structure of the XML document.

11. The article of manufacture of claim 10 further comprising skipping an XML data element that does not have a matching qualified tag and using a next XML descriptor having a qualified tag to format an associated XML data element associated therewith.

* * * * *